United States Patent [19]

Tsui

[11] Patent Number: 5,050,975
[45] Date of Patent: Sep. 24, 1991

[54] DOUBLE DUTY REARVIEW MIRROR

[76] Inventor: Yu-Ming Tsui, No.16-11, 3 Floor, 189 Lane, Sec.4, Chengkung Rd., Neihu Locality, Taipei, Taiwan

[21] Appl. No.: 620,541

[22] Filed: Nov. 29, 1990

[51] Int. Cl.⁵ ............................................. G02B 7/18
[52] U.S. Cl. ................................... 359/508; 359/507; 359/841; 359/877
[58] Field of Search .............. 350/604, 605, 633, 637, 350/639, 582, 583

[56] References Cited

U.S. PATENT DOCUMENTS

| | | | |
|---|---|---|---|
| 3,495,366 | 2/1970 | Allen | 350/583 |
| 3,711,179 | 1/1973 | Takeda | 350/583 |
| 4,225,212 | 9/1980 | Grabowski | 350/583 |
| 4,699,478 | 10/1987 | Tsui et al. | 350/583 |
| 4,728,180 | 3/1988 | Janowicz | 350/604 |
| 4,929,072 | 5/1990 | Fujie et al. | 350/582 |

*Primary Examiner*—Bruce Y. Arnold
*Assistant Examiner*—J. P. Ryan

[57] ABSTRACT

A rearview mirror includes a mirror body pivotally connecting thereto a securing frame mounting therein a rotatable carrier mounting therein a transparent glass capable of being set in rotation by an energized motor. When the securing frame is held against a door window of a vehicle, the transparent glass will be rotated and enable the driver to clearly see the rearview mirror through the door window and the transparent glass in a rainy or snowy day. The height of the securing frame can optionally be adjusted so that the driver can choose the best angle to see the rearview mirror through the door window and the transparent glass mounted in the securing frame.

2 Claims, 5 Drawing Sheets

DOUBLE DUTY REARVIEW MIRROR

BACKGROUND OF THE INVENTION

The present invention relates to a mirror, and more particularly to a rearview mirror.

A vehicle driver should have the experience that he cannot clearly see the rearview mirror in a rainy or snowy day because of the fact that the door window of the vehicle is fully covered by raindrops or snowflakes which causes danger in some circumstance. It is therefore tried by the Applicant to deal with this situation.

SUMMARY OF THE INVENTION

It is therefore an object of the present invention to provide a double duty rearview mirror capable of being clearly seen by a driver in a rainy or snowy day.

According to the present invention, a rearview mirror includes a mirror body pivotally connecting thereto a securing frame mounting therein a rotatable carrier mounting therein a transparent glass rotated by a motor coaxially transmitting a pulley rotating the carrier through a belt so that when the securing frame is held against a door window of a vehicle and the motor is energized, the transparent glass will be rotated and enable the driver to clearly see the rearview mirror through the door window and the transparent glass in a rainy or snowy day. The height of the securing frame can optionally be adjusted so that the driver can choose the best angle to see the rearview mirror through the door window and the transparent glass mounted in the securing frame.

DETAILED DESCRIPTION OF THE PREFERRED EMBODIMENT

Figures 1, 2:
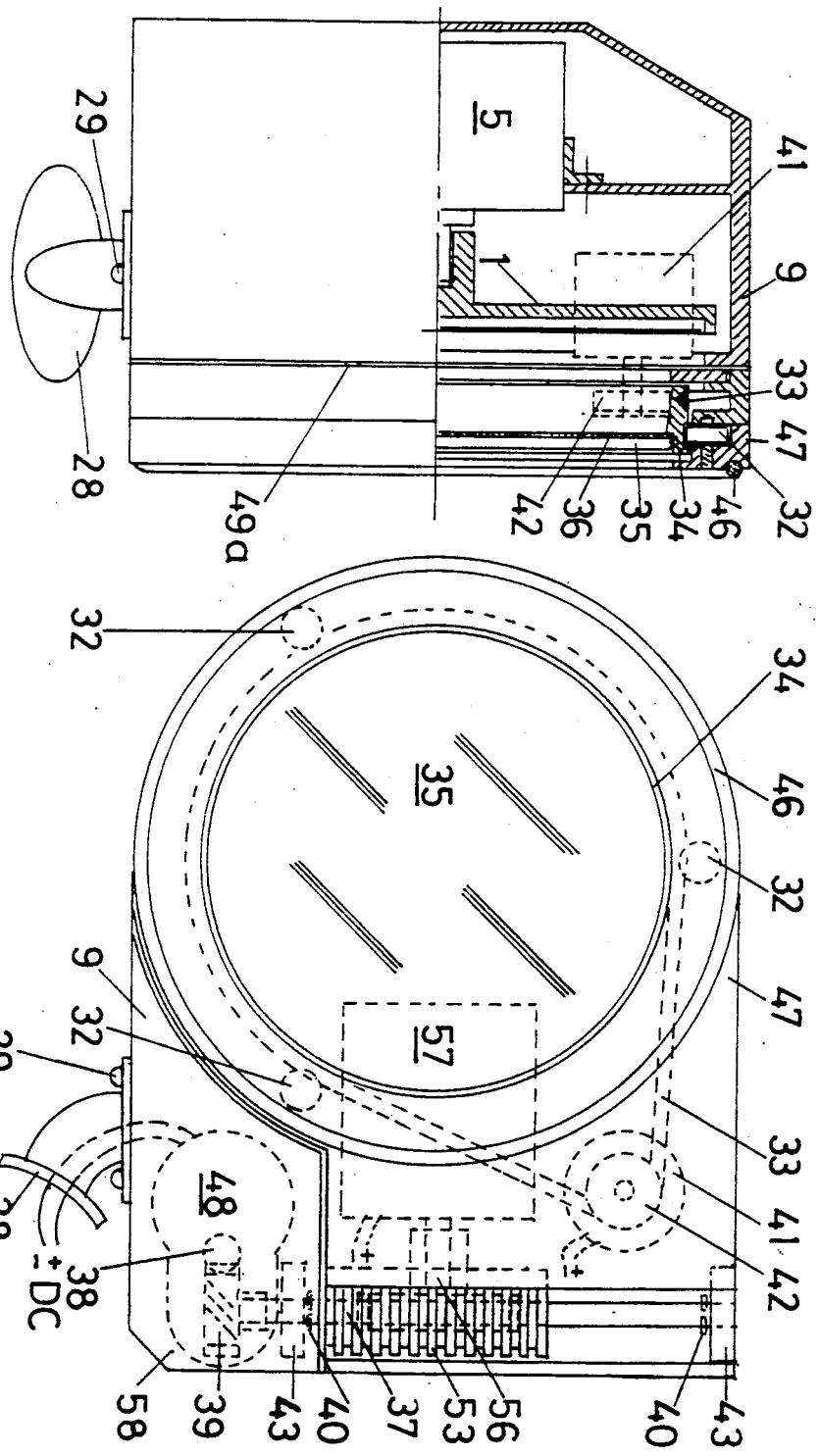
FIG. 1 is a cross sectional view of a preferred embodiment of a double duty rearview mirror according to the present invention.
FIG. 2 is a front view of a double duty rearview mirror in FIG. 1.

Referring now to FIGS. 1 to 8, a double duty rearview mirror according to the present invention includes a mirror body 9 fixed to one side 50 of a vehicle 52, a securing frame 47 pivotally connected to mirror body 9 by hinging a first hinge, said first hinge composed of an outer sleeve 53 with a larger outer diameter mounted therein an inner sleeve 44 with a smaller outer diameter mounted therein a spindle 37, spindle 37 is connected to bearings 43 fixed on the two sides of mirror body 9, spindle 37 also has a slot alone its longitudinal axis, two bores are provided with suitable distance between each other on the wall of inner sleeve 44, two small spindles 54 each mounted with a small roller 55 are installed into said bores and the rotating direction of small rollers 55 are parallel to the longitudinal axis of inner sleeve 44, small rollers 55 protrude from inner portion of the wall of inner sleeve 44 into said slot of spindle 37 so that spindle 37 can be rotated and securing frame 47 is capable of being pivoted to match against mirror body 9 in a first instance and to be held against a door window 51 of side 50 in a second instance, a transparent glass 35, a rotatable carrier 34 for mounting glass 35 therein and is mounted in securing frame 47, a first DC motor 41 mounted in securing frame 47 and having a motor shaft coaxially mounting thereon a transmitting pulley 42, a first helical gear 39 is coaxially fixed to spindle 37, a second helical gear 38 meshing with first helical gear 39 is mounted on the shaft of the gear box of a second DC motor 48 mounted in mirror body 9 so that the first and second instances can be selectively obtained by energizing the second motor 48 to rotate helical gear 38, and a belt 33 mounted between pulley 42 and carrier 34 around the circumferences of pulley 42 and carrier 34 so that when securing frame 47 is held against door window 51 and the first motor 41 is energized, glass 35 will be rotated and enable the driver to clearly see the mirror on body 9 through door window 51 and transparent glass 35 in a rainy or snowy day since raindrops or snowflakes cannot stay on the rotating glass 35.

Figure 3:
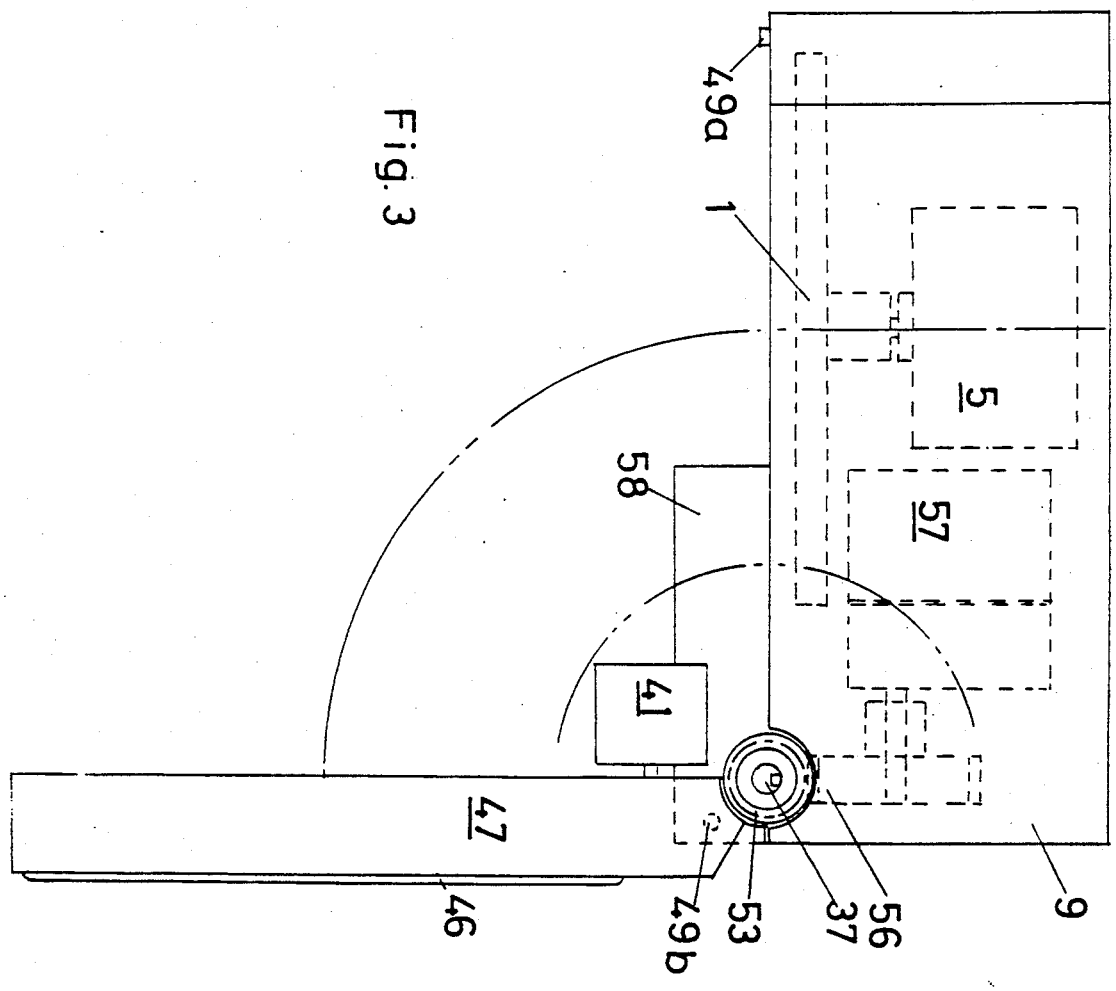
FIG. 3 is a schematical view showing the relationship between a mirror body and a securing frame of a double duty rearview mirror in FIG. 1.
Figure 4:
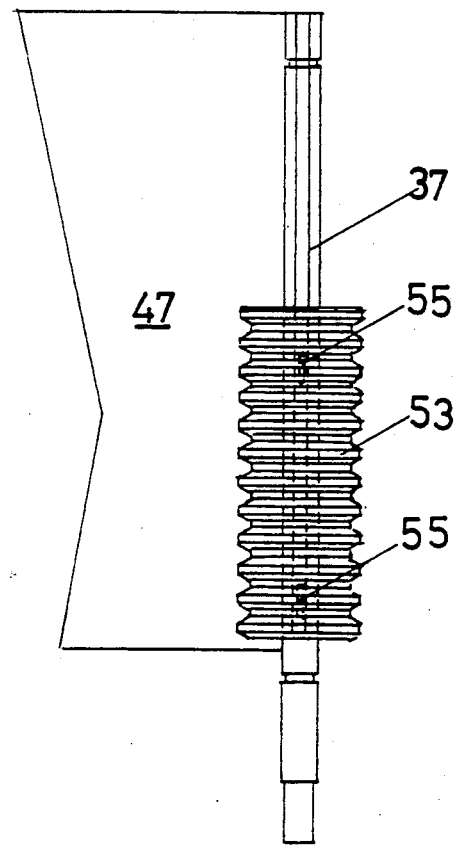
FIG. 4 is an enlarged view of the outer sleeve 53 with spindle 37.
Figure 5:
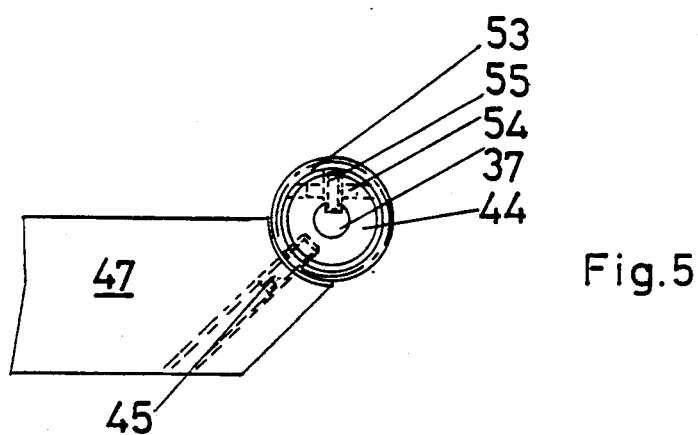
FIG. 5 is an enlarged view of the structure of inner sleeve 44, roller 55, small spindle 54, spindle 37 and the outer sleeve 53.
Figure 6:
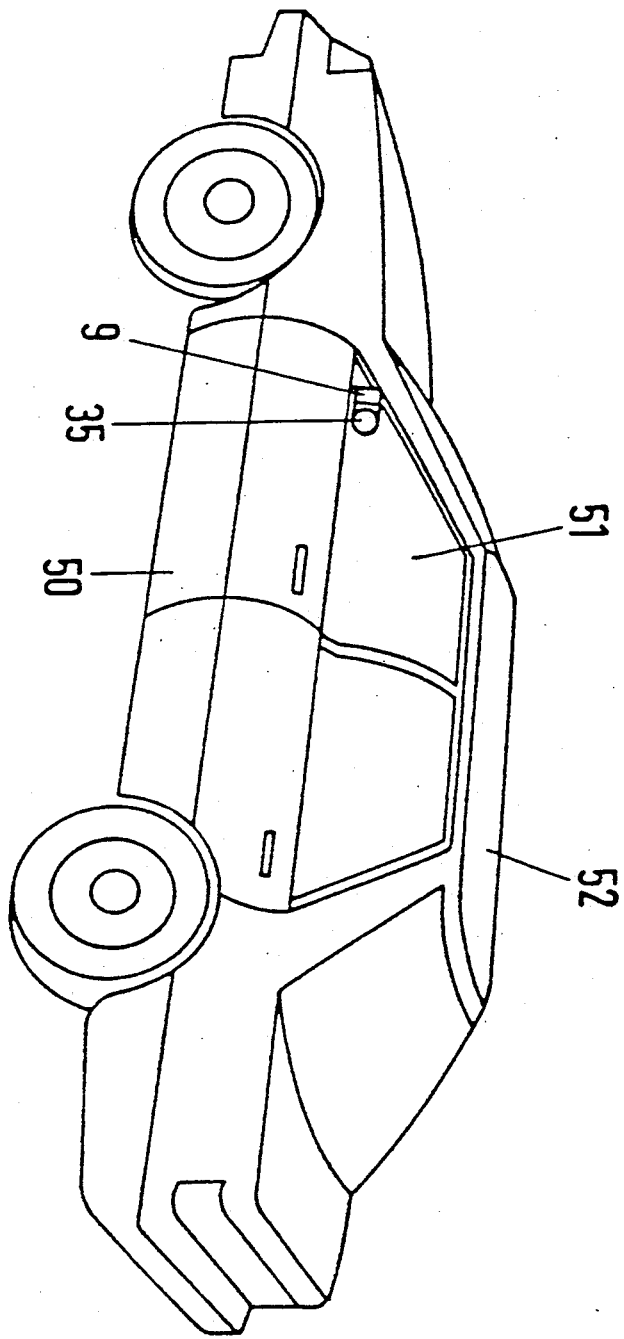
FIG. 6 is a schematic view showing a vehicle incorporating a double duty rearview mirror in FIG. 1.

The present invention can be further improved by adding a third DC motor 57 mounted in body 9 to adjust the height of securing frame 47. In this embodiment, several grooved gear rings parallel to each other are provided around the outer surface of outer sleeve 53 meshing with spur gear 56 mounted on the shaft of the gear box of the third motor 57 (as shown in FIGS. 2 and 3) so that a second hinge composed of the inner sleeve 44, outer sleeve 53, small spindles 54 and small rollers 55 is thus formed to selectively rise up securing frame 47 when it is held against the door window 51 of side 50 and to set down securing frame 47 when it is matched against mirror body 9 by energizing the third motor 57.

Glass 35 can be mounted in carrier 34 by an adhesive and a silicone sealant 36. Carrier 34 can be centrally mounted in securing frame 47 by 3 supporting wheels 32. Glass 35 can be rotated by motor 41 at about 1000 rpm. If it is not rainy or snowy, securing frame 47 is caused to match against mirror body 9 and the driver can clearly see the mirror on body 9 through glass 35 positioned right ahead mirror body 9.

The situation that packing 46 on securing from 47 can not be tightly contacted with door window 51 will not occur because the angle between mirror body 9 and door window 51 is constant.

Figure 7:
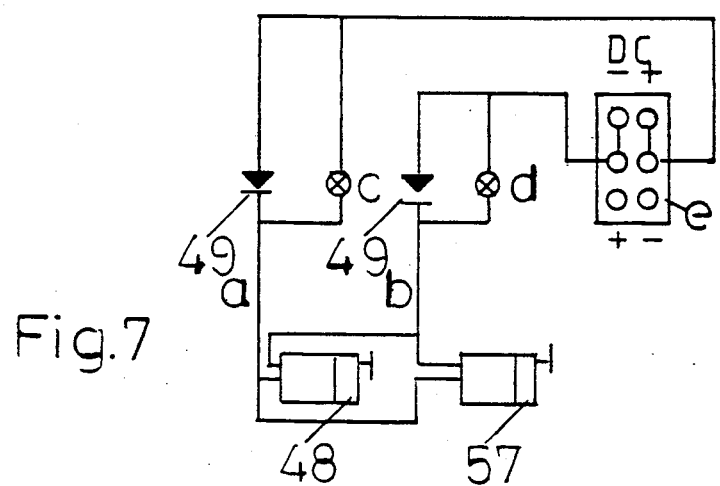
FIG. 7 is a schematic view showing the remote control circuit of DC motors 48 and 57 when packing 46 is tightly contacted to door window 51.
Figure 8:
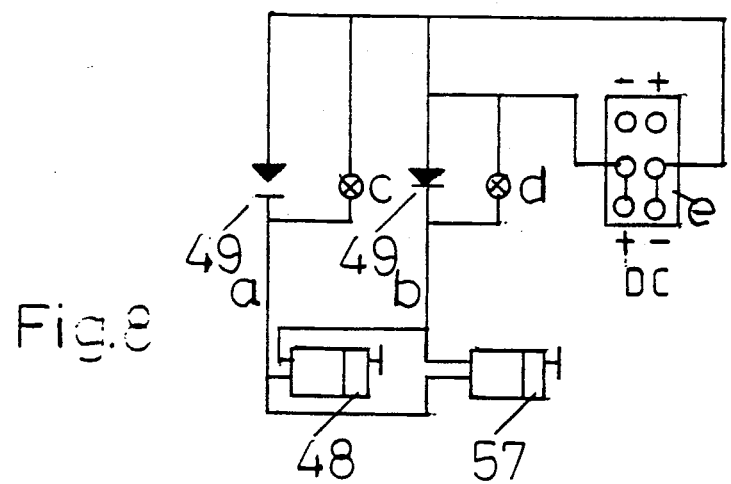
FIG. 8 is a schematic view showing the remote control circuit of DC motors 48 and 57 when securing frame 47 is set down and is matched against mirror body 9.

The remote control circuits of DC motors 48 and 57 which enable the horizontal and vertical movements of securing frame 47 are that when packing 46 is tightly contacted against door window 51, micro switch 49b is off (as shown in FIG. 7), yet when the driver pushes button d, DC motors 48 and 57 are electrified to drive spindle 37 and spur gear 56 so that securing frame 47 will be set down when it is matched against mirror body 9, at this time, micro switch 49b is on since the pressure is gone (as shown in FIG. 8). so the current will not be interrupted even push button d is off, and now main switch e is connected to upper DC power.

When securing frame 47 is matched against mirror body 9, micro switch 49a is pressured to be off, and main switch e is connected to lower DC power, yet when driver pushes button c, DC motors 48 and 57 are electrified to drive spindle 37 so that securing frame 47 will be held against door window 51. The current will not be interrupted even push button c is off, because the pressure is gone and micro switch 49a is on. While securing frame 47 is moving, because micro switch 49b is not pressured and is on, driver can push button d to enable DC motor 57 to rotate reversely to drive securing frame 47 to rise up.

In a rainy or snowy day, helical gear 38 can be motor-assistedly rotated to drive helical gear 39 to hold securing frame 47 against door window 51 and spur gear 56 can be optionally motor-assistedly rotated to drive the said grooved gear rings to rise up securing frame 47 when held against door window 51 so that the present rearview mirror can work as above stated. If there has been some raindrops or snowflakes on door window 51 before the present rearview mirror works, door window 51 can be cranked down about 10 cm and then cranked upwards to clear the relevant portion of window 51 of raindrops or snowflakes since securing frame 47 has a packing 46 tightly contacting with door window 51.

What is claimed is:

1. A rearview mirror comprising:

a mirror body adapted to be fixed to one side of a car:

a securing frame pivotally connected to said mirror body by hinging a first hinge:

said first hinge composed of an outer sleeve with a large outer diameter mounted therein an inner sleeve with a smaller outer diameter mounted therein a spindle;

said spindle is connected to bearings fixed on the two sides of said mirror body, said spindle has a slot along its longitudinal axis and two bores are provided with suitable distance between each other on the wall of said inner sleeve, two small spindles each mounted with a small roller are installed into said bores and the rotating direction of said small rollers are parallel to the longitudinal axis of said inner sleeve, said small rollers protrude from inner portion of the wall of said inner sleeve into said slot of said spindle so that said spindle can be rotated and said securing frame is capable of being pivoted to match against said mirror body in a first instance and to be held against a door window of said one side in a second instance;

a transparent glass:

a rotatable carrier for mounting said glass therein and is mounted in said securing frame:

a first motor mounted in said securing frame and having a shaft:

a transmitting pulley coaxially mounted on said shaft:

a belt mounted between said pulley and said carrier around the circumferences of said pulley and said carrier:

a second motor mounted in said mirror body and having a gear box with a shaft;

a first helical gear is coaxially fixed to said spindle:

a second helical gear meshing with said first helical gear is mounted on said shaft of said gear box of said second motor so that said first and second instances can be selectively obtained by energizing said second motor to rotate said second helical gear, and then when said securing frame is held against said door window and said first motor is energized, said transparent glass will be rotated and enable a driver to clearly see said mirror body through said door window and said transparent glass in a rainy or snowy day.

2. The rearview mirror as set forth in claim 1 wherein a third motor mounted in said mirror body and having a gear box with a shaft:

several grooved gear rings parallel to each other are provided around the outer surface of said outer sleeve meshing with a spur gear provided on said shaft of said gear box of said third motor so that said securing frame can be selectively risen up when it is held against said door window and set down when it is matched against said mirror body by energizing said third motor.

* * * * *